United States Patent Office 3,153,004
Patented Oct. 13, 1964

3,153,004
COMPOSITIONS CONTAINING HYDROLYZED VINYL ESTER HOMOPOLYMERS OR VINYL ESTER/ETHYLENE COPOLYMERS AND SELECTED FLUOROALCOHOLS
William J. Middleton, Wilmington, Del., assignor to E. I. du Pont de Nemours and Company, Wilmington, Del., a corporation of Delaware
No Drawing. Filed Sept. 29, 1961, Ser. No. 141,593
20 Claims. (Cl. 260—33.4)

This invention relates to, and has as its principal object provision of, novel polymer compositions comprising, as essential ingredients, synthetic polyhydroxy polymers containing vinyl alcohol units and certain polyhalogenated alcohols.

In many applications of high molecular weight polymers, such as film casting, coating, molding, use as adhesives, etc., solubility in organic solvents is a desirable property. Solubility at low or moderate temperatures, e.g., room temperature, is especially desirable in order to avoid or minimize the degradation of the polymer which often takes place when solution must be effected at high temperatures to achieve a practically useful concentration of the polymer in the solvent. In addition to fluid solutions, solid or semisolid compositions wherein the polymer is homogeneously mixed with relatively small amounts of solvent serving as plasticizer or physical modifier have great utility in polymer technology, and these also require good solubility in the solvent at ordinary temperature.

Many polyhydroxy polymers suffer from the disadvantages of poor solubility, or even complete insolubility, in organic solvents and thus are not as broadly useful as they would otherwise be. This is particularly the case with polyvinyl alcohol and the hydrolyzed olefin/vinyl carboxylate copolymers.

Some polyhydroxy polymers, for example, polyvinyl alcohol, are normally soluble in water (although special processes are known whereby polyvinyl alcohol is obtained as a material insoluble in and unaffected by boiling water). However, solutions of such water-soluble polymers in organic solvents are still highly desirable for many uses, for example, in spinning a polymer solution into another liquid medium which does not dissolve, and therefore coagulates, the polymer; in film casting, where quick evaporation of the solvent is desired; in extruding plasticized polymer/solvent compositions( solid solutions) to form shaped objects, for example, by injection molding; in the preparation of clear solutions free from the undissolved particles (called "eyes" in the trade) which frequently occur in aqueous solutions; etc.

It has now been found that certain high molecular weight, synthetic, linear polyhydroxy polymers are soluble in the specific polyhalogenated alcohols of the class defined below.

The new products provided by this invention are homogeneous compositions comprising as their essential ingredients an essentially linear polymer of molecular weight at least 3000, said polymer being a hydrolyzed vinyl carboxylate homopolymer or vinyl carboxylate/ethylene copolymer wherein the ratio of vinyl carboxylate units to ethylene units is between 1:5 and 50:1, the degree of hydrolysis in said hydrolyzed polymers and copolymers being at least 80%; and a polyhaloalcohol in which all halogen atoms are of atomic number 9 to 17, i.e., are fluorine or chlorine, said polyhaloalcohol having one of the general formulas:

(I) 

where R is perhalomethyl or an ω-chloro- or ω-hydroperfluoroalkyl radical of 1 to 4 carbon atoms; R' is fluoroperhalomethyl or an ω-chloro- or ω-hydroperfluoroalkyl radical of 1 to 4 carbon atoms; and A is H, OH, perhalomethyl, phenyl, halophenyl, hydroxyphenyl, —C≡CH, —C≡C—C$_6$H$_5$, or alkoxy of 1 to 2 carbon atoms; and (II) 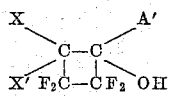

where X and X' are fluorine or chlorine, and A' is OH, alkoxy of 1 to 2 carbon atoms, phenyl, halophenyl or hydroxyphenyl.

It will be seen from Formula I and II that the polymer solvents suitable for use in the compositions of this invention are secondary and tertiary polyhaloalcohols having a specific structure. Among such alcohols are included the gem-diols or 1,1-diols, i.e., the polyketone hydrates (A=OH in Formulas I and II).

For reasons of greater accessibility and effectiveness as solvents, the preferred polyhaloalcohols are those corresponding to formula I and in which R and R' are fluoroperhalomethyl groups, i.e., CF$_3$, CF$_2$Cl and CFCl$_2$, and A is H or OH, especially the latter.

Many of the above-defined secondary or tertiary polyhaloalcohols can be prepared by methods described in the literature or by extensions of these published methods. Others are obtainable by methods described in copending patent applications. These include:

(1) The hydrates of the open-chain polyfluoroperhalo- and ω-hydropolyfluoroperhaloketones, i.e., the compounds of Formula I where A is hydroxyl. These gem-diols can be prepared by the process of U.S. Patent 2,980,738 or, as described in application Ser. No. 730,266, filed by D. W. Wiley on April 23, 1958, now Patent No. 3,091,643, by the reaction, in a molar ratio of at least 2:1, of an ester of a polyfluoroperhalo- or ω-hydropolyfluoroperhaloalkanecarboxylic acid with an alkali metal alkoxide at temperatures below about 100° C., followed by acidification. This reaction gives the ketones and/or their hydrates, i.e., the gem-diols.

(2) The hydrates and hemiketals of polyfluoroperhalocyclobutanones, i.e., the products of Formula II where A' is hydroxy or alkoxy. These compounds can be prepared by the method described in D. C. England's U.S. Patent 3,039,995 and his application Ser. No. 43,331, filed July 18, 1960. This method comprises the hydrolysis by concentrated sulfuric acid of the 1,3,3,4,4-pentafluoro-2,2-dihalo-1-hydrocarbyloxycyclobutanes, i.e., the ethers of the formula

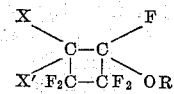

where X and X' are fluorine or chlorine and R is a hydrocarbon radical, which are themselves prepared by cycloaddition at 125–250° C. of the requisite difluoroperhaloolefin

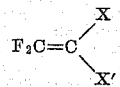

and a perfluorovinyl hydrocarbyl ether F$_2$C=CFOR. The hydrolysis step yields the polyfluoroperhalocyclobutanones and/or their hydrates. The free ketones form hydrates or hemiketals rapidly and spontaneously by reaction with water or alcohols.

(3) The 1-phenyl, 1-hydroxyphenyl and 1-halophenylperhalocyclobutanols, i.e., the compounds of Formula II where A' is phenyl, hydroxyphenyl or halophenyl. These compounds can be prepared by the process described in application Ser. No. 32,541, filed by D. C. England on May 31, 1960. In this process a 3,3,4,4-tetrafluoro-2,2-dihalocyclobutanone is reacted with an aromatic hydrocarbon (e.g., benzene) in the presence of conventional Friedel-Crafts catalysts, or with phenol or a halobenzene, in which case no catalyst is necessary. With the more reactive systems the reaction is spontaneous and exothermic. In other cases, a reaction temperature in the range of 75–200° C. is suitable.

(4) The bis-perhaloalkyl (or ω-hydroperhaloalkyl) phenyl-, hydroxyphenyl-, or halophenyl carbinols, i.e., the compounds of Formula I where A is phenyl, hydroxyphenyl or halophenyl. These compounds can be prepared by the methods described in application Ser. No. 107,296, filed on May 3, 1961 by D. C. England. In these methods the appropriate polyhaloalkylketone is condensed with the appropriate aromatic reactant in the presence of the usual Friedel-Crafts catalysts, at moderate temperatures in the range of 50–150° C.; or the polyhaloalkylketone is reacted with an arylmagnesium bromide in anhydrous ether, at temperatures which may be as low as −50° C. and generally need not exceed room temperature.

(5) The bis(ω-hydroperfluoroalkyl)carbinols, i.e., the compounds of Formula I where R and R′ are ω-hydroperfluoroalkyl groups and A is hydrogen. These compounds can be prepared by the process described in U.S. Patent 3,022,356, which consists in (a) telomerizing tetrafluoroethylene and methanol as described in U.S. Patent 2,558,628; (b) esterifying the primary alcohols present in the reaction mixture with a carboxylic acid or anhydride; and (c) distilling the resulting reaction mixture to separate the bis(ω-hydroperfluoroalkyl)carbinols from the esters of the primary alcohols.

For illustrative purposes, a number of representative specific polyhaloalcohols suitable for use in the compositions of this invention are listed below by name and formula:

2H-hexafluoro-2-propanol $$CF_3\text{—}CHOH\text{—}CF_3$$

1,3-dichloro-1,1,3,3-tetrafluoro-2-propanol $$ClF_2C\text{—}CHOH\text{—}CF_2Cl$$

1,1,3-trichloro-1,3,3-trifluoro-2-propanol $$Cl_2FC\text{—}CHOH\text{—}CF_2Cl$$

1H,3H,7H-dodecafluoro-3-heptanol $$H(CF_2)_2\text{—}CHOH\text{—}(CF_2)_4H$$

1H,5H,9H-hexadecafluoro-5-nonanol $$H(CF_2)_4\text{—}CHOH\text{—}(CF_2)_4H$$

Perfluoro(2,2-propanediol)

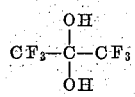

1,1,3-trichloro-1,3,3-trifluoro-2,2-propanediol

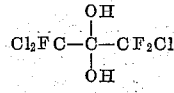

1,3-dichloro-1,1,3,3-tetrafluoro-2,2-propanediol

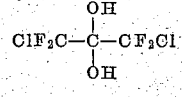

1,1,3,3-tetrachloro-1,3-difluoro-2,2-propanediol

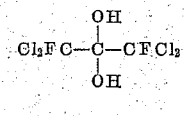

1,1,1-trichloro-3,3,3-trifluoro-2,2-propanediol

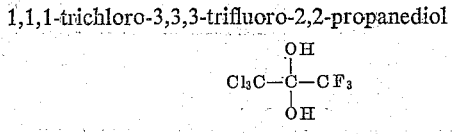

1,5-dichlorooctafluoro-3,3-pentanediol

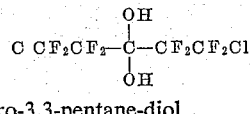

1H,5H-octafluoro-3,3-pentane-diol

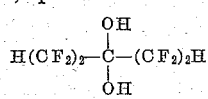

1H,9H-hexadecafluoro-5,5-nonanediol

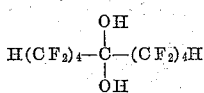

Perfluoro(2-methyl-2-propanol)

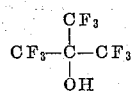

1,4,4,4-tetrachloro-3-trichloromethyl-1,1,2,2-tetrafluoro-3-butanol

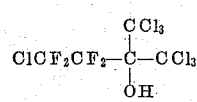

1,3-dichloro-1,1,3,3-tetrafluoro-2-phenyl-2-propanol

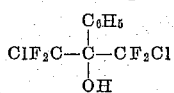

2-phenylhexafluoro-2-propanol

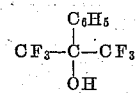

1,1,3-trichloro-1,3,3-trifluoro-2-(p-chlorophenyl)-2-propanol

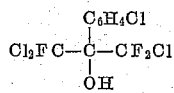

1H,7H-3-(p-hydroxyphenyl)dodecafluoro-3-heptanol

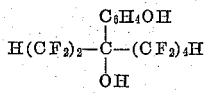

1,3-dichloro-1,1,3,3-tetrafluoro-2-(p-hydroxyphenyl)-2-propanol

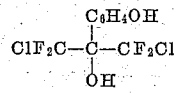

1,1-bis(chlorodifluoromethyl)-2-propyn-1-ol

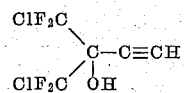

1,1-bis(trifluoromethyl)-2-propyn-1-ol

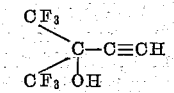

1,1-bis(chlorodifluoromethyl)-3-phenyl-2-propyn-1-ol

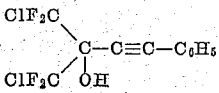

2-methoxyhexafluoro-2-propanol

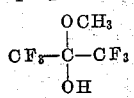

1,3-dichloro-1,1,3,3-tetrafluoro-2-ethoxy-2-propanol

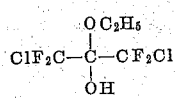

1H,9H-5-methoxyhexadecafluoro-5-nonanol

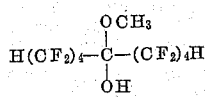

Perfluoro(1,1-cyclobutanediol)

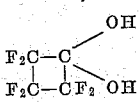

2-chloro-2,3,3,4,4-pentafluoro-1,1-cyclobutanediol

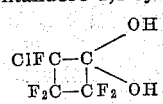

2,2-dichloro-3,3,4,4-tetrafluoro-1,1-cyclobutanediol

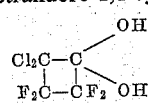

1-methoxyhexafluorocyclobutanol

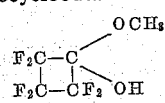

2-chloro-2,3,3,4,4-pentafluoro-1-ethoxycyclobutanol

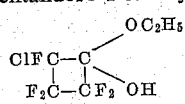

1-phenylhexafluorocyclobutanol

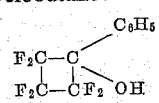

1-(p-chlorophenyl)hexafluorocyclobutanol

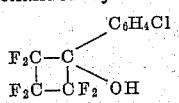

1-(p-hydroxyphenyl)-2,2-dichlorotetrafluorocyclobutanol

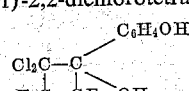

Most of the polyhaloalcohols defined by Formulas I and II are liquids at ordinary temperature. Others are solids with relatively low melting points. Such solids, however, are suitable for use in the compositions of this invention since, at or slightly above their melting point, they dissolve polyhydroxy polymers of the type defined above. In some cases, the solutions remain liquid at room temperature owing to the melting point—depressing effect of the solute. In other cases, they solidify to solid solutions, which can be reliquefied readily on warming when a fluid solution is needed. Furthermore, the normally solid polyhaloalcohols are suitable for the preparation of solid, homogeneous blends with the polymer, to which they impart plasticizing or softening effects. Also, some normally solid polyfluoroperhaloketone hydrates (gem-diols) are capable of forming more or less well defined higher hydrates containing from about 0.5 to about 1.5 moles of additional water. Such higher hydrates are usually liquid at room temperature or below and they are suitable for the purposes of this invention since they permit forming fluid solutions at temperatures lower than the melting point of the water-free gem-diol without appreciable decrease in solvent power.

The polyhydroxy polymers with which this invention is concerned are the hydrolysis products of vinyl carboxylate polymers or vinyl carboxylate/ethylene copolymers, in which products at least 80% of the acyloxy groups are hydrolyzed to hydroxyl groups. Polyhydroxy polymers of this kind are well known in the art. They include, first, polyvinyl alcohol, this term embracing the hydrolysis products of polyvinyl acetate or other polyvinyl carboxylates, e.g., polyvinyl formate or propionate, which products may be substantially completely hydrolyzed or may contain minor amounts of residual vinyl ester units. Polyvinyl alcohol is usually obtained commercially as the water-soluble product. However, it can be prepared in an advantageous water-insoluble and water-resistant state by the special procedures described in U.S. Patents 2,610,359 and 2,610,360. Both the water-soluble and the water-insoluble forms of polyvinyl alcohol are entirely suitable for the purposes of this invention. Another group of polymers contemplated for use in this invention comprises the hydrolyzed copolymers of ethylene and vinyl carboxylates described in U.S. Patent 2,386,347. These products, which are at least 80% hydrolyzed, are obtained from copolymers wherein the ratio of vinyl carboxylate units to ethylene units is between 1:5 and 50:1. The vinyl ester can be that of any monocarboxylic acid, but it is preferably the ester of an acid of formula $$C_nH_{2n+1}COOH$$

wherein $n$ is an integer from 0 to 3, such as vinyl formate, vinyl acetate, vinyl propionate or vinyl butyrate. The hydrolyzed vinyl acetate/ethylene copolymers are the most important products in this group, and the substantially completely hydrolyzed polymers are especially preferred.

The technically most valuable polyhydroxy polymers of the above type have an average molecular weight of at least 3000 and generally at least 5000. The ease of solution of these polymers depends in part on the molecular weight, but even polymers of very high molecular weight, up to 125,000 or even higher, are soluble in the fluoroalcohols of the type defined above.

The polymer-solvent mixtures of this invention are homogeneous, single-phase compositions. From the standpoint of physical characteristics, they comprise solid compositions in which the polymer is plasticized or otherwise modified with minor amounts of the polyhaloalcohol, which may be as low as 0.5% by weight of the polymer, i.e., a weight ratio of 0.005:1; semisolid compositions, in which the polymer has incorporated therein sufficient amounts of the polyhaloalcohol to make it readily deformable; highly viscous solutions; and fluid solutions, which can contain as much as 10,000% of the polyhaloalcohol by weight of the polymer, i.e., a weight ratio of 100:1. In general, the most useful compositions, which may be fluid or solid at room temperature, are those containing the polyhaloalcohol and the polymer in weight ratios between 1:1 and 50:1.

The compositions can contain more than one polyhaloalcohol solvent. For example, it is sometimes advantageous to prepare a solution of polymer in a mixture of two or more polyhaloalcohols, one of which is readily volatile while the other or others have lower volatility and are retained, at least in part, within the polymer upon evaporation of the volatile solvent.

It is also within the scope of this invention to use the polyhaloalcohol in admixture with minor amounts of miscible organic liquids which have little or no solvent action on the polymer. Such compositions sometimes offer technical advantages, e.g., they may lend themselves better to the formation of shaped objects by extrusion or casting. Water may also be present in minor amounts, insufficient to destroy the homogeneity of the composition. The water, for example, may be that present in the already mentioned polyhaloketone higher hydrates, such as the compound corresponding in composition to $(CF_3)_2C(OH)_2 \cdot \frac{1}{2}H_2O$. Even higher amounts of water, up to about 1.5 moles per mole of polyhalo gem-diol, can be used. With the water-soluble polyhydroxy polymers and the water-miscible polyhaloalcohols, still higher amounts of water can be present, although the advantages of the invention are fully realized only when the polyhaloalcohol constitutes the major portion of the total solvent.

The compositions can, of course, contain various non-essential ingredients such as resins, waxes, antioxidants, corrosion inhibitors, acid acceptors, ultraviolet light absorbers, fillers and other additives.

The following examples illustrate specific embodiments of the invention.

In Examples I–X, which are given in tabular form for the sake of conciseness, use was made of one or more of the following representative polyhydroxy polymers:

A. A commercially available polyvinyl alcohol which was an 88% hydrolyzed polyvinyl acetate.

B. A substantially completely hydrolyzed ethylene/vinyl acetate copolymer containing 5% by weight of ethylene units.

C. A substantially completely hydrolyzed ethylene/vinyl acetate copolymer in which the ratio of ethylene units to vinyl acetate units was 2.9:1 (approximately 65% by weight of ethylene units).

D. A yarn made from a substantially completely hydrolyzed ethylene/vinyl acetate copolymer in which the ratio of ethylene units to vinyl acetate units was 2.5:1 (approximately 60% by weight of ethylene).

The polymer was added to the polyhaloalcohol designated in the table below at a concentration of about 5% by weight. In many cases, solution took place at room temperature in a few minutes. Raising the temperature to 90–100° C. was sometimes required to obtain rapid solution. When this was done, the polymer generally remained dissolved when the hot solution was cooled to room temperature. In some cases, the solution gelled on cooling and there was occasionally partial separation of the polymer, but the polymer redissolved on warming. The solutions were used to form films by casting on a support and allowing the solvent to evaporate. The films were coherent, self-supporting when detached from the support, free from undissolved particles, and, in nearly all cases, clear and free from haze.

The notations shown in the table below have the following meanings:

R.T.=soluble at room temperature.
H.=soluble at 90–100° C.
H., gel.=soluble at 90–100° C., gelled on cooling.
H., sep.=soluble at 90–100° C. some polymer separation on cooling.
N.T.=not tested.

*Examples I–VI*

| Example | Solvent | Polymer | | | |
|---|---|---|---|---|---|
| | | A | B | C | D |
| I | $CF_2Cl-C(OH)(OH)-CF_2Cl$ | H., sep. | H., gel. | R.T. | R.T. |
| II | $CF_3-C(OH)(OH)-CF_3 \cdot \frac{1}{2}H_2O$ | H., R.T. | H., R.T. | H., sep. | H., sep. |
| III | $CF_3-C(OH)(OH)-CF_3$ | H., R.T. | H., T.R. | H., sep. | N.T. |
| IV | $CF_2Cl-C(OH)(OH)-CFCl_2$ | R.T. | N.T. | N.T. | N.T. |
| V | $CF_2Cl-CHOH-CF_2Cl$ | R.T. | N.T. | N.T. | N.T. |
| VI | $CF_3-CHOH-CF_3$ | R.T. | R.T. | H., R.T. | H. |

*Examples VII–X*

| Example | Solvent | Polymer | | | |
|---|---|---|---|---|---|
| | | A | B | C | D |
| VII | $CF_3-C(C_6H_5)(OH)-CF_3$ | H., gel. | H. | R.T. | R.T. |
| VIII | $H(CF_2)_2-CHOH-(CF_2)_4H$ | H., R.T. | H. | H., R.T. | H., R.T. |
| IX | $F_2C-C(OH)(OH \cdot 1H_2O)-CF_2-CF_2$ (ring) | R.T. | N.T. | N.T. | N.T. |
| X | $ClCF_2CF_2-C(CCl_3)(OH)-CCl_3$ | R.T. | N.T. | N.T. | N.T. |

In Examples XI–XVI, which are also given in tabular form, the polyhydroxy polymer was a substantially completely hydrolyzed polyvinyl acetate. In all cases, clear solutions of 5–10% concentration of the polymer in the tabulated solvent were obtained at the temperature shown. These solutions were stable and showed no polymer separation on standing.

*Examples IX–XVI*

| Example | Solvent | Solution Temp., °C. |
|---|---|---|
| XI | CFCl₂—CHOH—CF₂Cl | 25 |
| XII | CF₂Cl—C(OH)—CF₂Cl | 100 |
| XIII | H(CF₂)₂—C(OH)—(CF₂)₄H | 100 |
| XIV | H(CF₂)₂—C(C₆H₄OH)(OH)—(CF₂)₂H | 100 |
| XV | (CF₂Cl)₂C(OH)—C≡C—C₆H₅ | 25 |
| XVI | F₂C—C(C₆H₄Cl)(OH)—CF₂—CF₂ (cyclic) | 25 |

The compositions of this invention are useful in many ways. Thus, the solid plasticized compositions containing minor amounts of polyhaloalcohol solvent are suitable as molding powders for use in the fabrication of shaped objects, for example, by molding or extruding into films, rods, filaments, tubes and other shapes. Solutions of suitably high viscosity can be used as adhesives to join together surfaces such as wood, metals, ceramics, etc. If desired, a partial solution can be made in place just before use by adding to the untreated polymer just enough polyhaloalcohol solvent to make it sticky, then pressing the sticky mixture between the surfaces to be bonded. In this manner, for example, two shaped pieces of the polymer itself can be welded together by moistening one or both with a little of the polyhaloalcohol solvent and pressing the pieces one against the other. Fluid polymer solutions are suitable for spinning into a non-solvent medium which coagulates the polymer. Solutions in relatively volatile polyhaloalcohols are suitable for dry spinning into a hot gaseous medium, for wire coating or for casting polymer films on porous or non-porous surfaces to achieve various purposes such as protective or decorative coatings, the fabrication of safety glass interliners, fuel cell liners, etc. These solutions can also be used to impregnate paper, cardboard or textile materials, for example, to obtain calendered fabrics or adhesive coatings. Further, a preformed object such as a molded article or a film made of the untreated polymer can be surface-treated with a polyhaloalcohol solvent to obtain various effects by partial or localized solution or etching.

Since obvious modifications and equivalents in the invention will be evident to those skilled in the chemical arts, I propose to be bound solely by the appended claims.

The embodiments of the invention in which an exclusive property or privilege is claimed are defined as follows:

1. A homogeneous composition of matter of (1) a first component consisting of an essentially linear polymer of a molecular weight of 3,000–125,000, said polymer being a member of the group consisting of hydrolyzed vinyl carboxylate homopolymers and hydrolyzed vinyl carboxylate/ethylene copolymers wherein the ratio of vinyl carboxylate units to ethylene units is between 1:5 and 50:1, the vinyl carboxylate being a vinyl ester of a carboxylic acid of the formula $C_nH_{2n+1}COOH$, wherein $n$ is an integer from 0 to 3, the degree of hydrolysis in said polymer being at least 80%, and (2) a second component consisting of a polyhaloalcohol in which all halogen units are of atomic number 9 to 17 having one of the general formulae

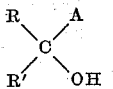

and

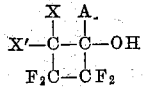

wherein: R is selected from the group consisting of perhalomethyl and ω-chloro- and ω-hydroperfluoroalkyl of up to 4 carbons; R' is selected from the group consisting of fluoroperhalomethyl and ω-chloro-and ω-hydroperfluoroalkyl of up to 4 carbons; A is selected from the group consisting of hydrogen, hydroxyl, perhalomethyl, phenyl, halophenyl, hydroxyphenyl, —C≡CH, —C≡C—C₆H₅; and alkoxy of up to 2 carbons; A' is selected from the group consisting of hydroxyl, alkoxy of up to 2 carbons, phenyl halophenyl and hydroxyphenyl; and X and X' are selected from the group consisting of fluorine and chlorine.

2. The composition of claim 1 wherein the first component is polyvinyl alcohol.

3. The composition of claim 1 wherein the second component is

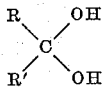

4. The composition of claim 1 wherein the second component is

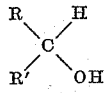

5. The composition of claim 1 wherein the second component is

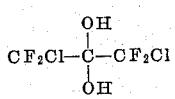

6. The composition of claim 1 wherein the second component is

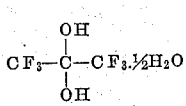

7. The composition of claim 1 wherein the second component is

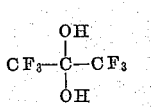

8. The composition of claim 1 wherein the second component is

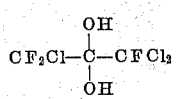

9. The composition of claim 1 wherein the second component is CF₂Cl—CHOH—CF₂Cl.

10. The composition of claim 1 wherein the second component is CF₃—CHOH—CF₃.

11. The composition of claim 1 wherein the second component is

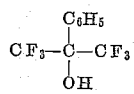

12. The composition of claim 1 wherein the second component is $H(CF_2)_2-CHOH-(CF_2)_4H$.

13. The composition of claim 1 wherein the second component is

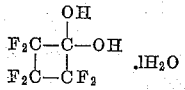

14. The composition of claim 1 wherein the second component is

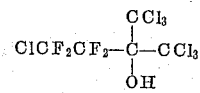

15. A homogeneous composition of matter of a substantially completely hydrolyzed polyvinyl acetate and $CFCl_2-CHOH-CF_2Cl$.

16. A homogeneous composition of matter of a substantially completely hydrolyzed polyvinyl acetate and

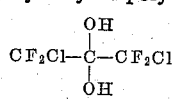

17. A homogeneous composition of matter of a substantially completely hydrolyzed polyvinyl acetate and

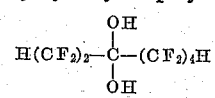

18. A homogeneous composition of matter of a substantially completely hydrolyzed polyvinyl acetate and

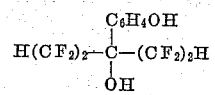

19. A homogeneous composition of matter of substantially completely hydrolyzed polyvinyl acetate and

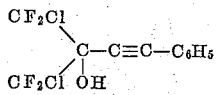

20. A homogeneous composition of matter of a substantially completely hydrolyzed polyvinyl acetate and

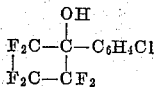

No references cited.

UNITED STATES PATENT OFFICE
CERTIFICATE OF CORRECTION

Patent No. 3,153,004                              October 13, 1964

William J. Middleton

It is hereby certified that error appears in the above numbered patent requiring correction and that the said Letters Patent should read as corrected below.

Column 10, lines 18 to 21, the formula should appear as shown below instead of as in the patent:

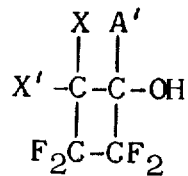

same column 10, claims 3 and 4, after the structural formulae, each occurrence, insert --, R and R' being fluoroperhalomethyl groups. --.

Signed and sealed this 2nd day of February 1965.

(SEAL)
Attest:

ERNEST W. SWIDER                         EDWARD J. BRENNER
Attesting Officer                     Commissioner of Patents